Patented Oct. 16, 1928.

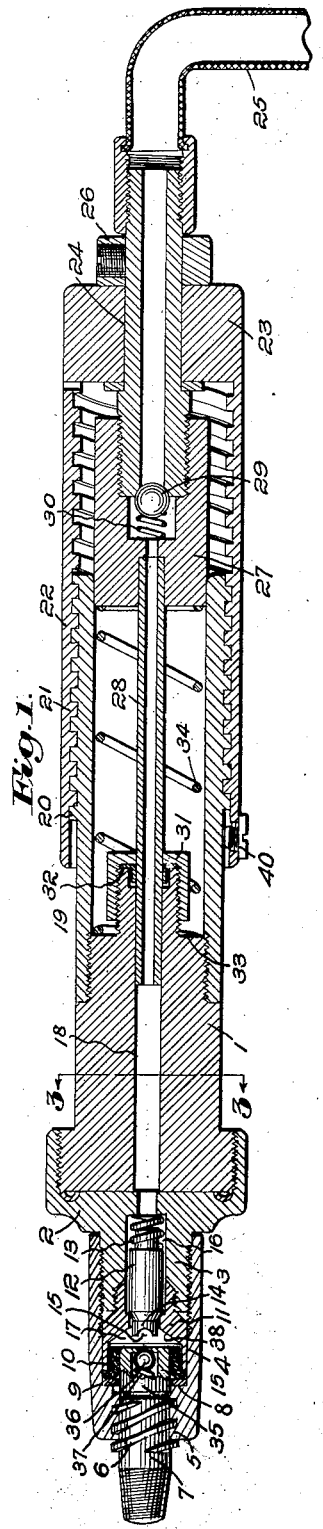

1,687,779

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICANT-EXPELLING APPARATUS.

Application filed February 11, 1925. Serial No. 8,585.

This invention aims to provide improvements in lubricant-expelling apparatus.

In the drawings, which illustrate a preferred embodiment of my invention:—

Figure 1 is a section of a high pressure lubricant-expelling device, being partly in elevation;

Fig. 2 is a section similar to that shown in Fig. 1, but showing the relation of the parts thereof when lubricant is being expelled to a lubricant-receiving nipple;

Fig. 3 is a section on the line 3—3 of Fig. 1;

Fig. 4 is an enlarged section on the line 4—4 of Fig. 2; and

Fig. 5 is an enlarged section on the line 5—5 of Fig. 2.

Referring to the drawings, I have illustrated a device for forcing lubricant to a lubricant-receiving nipple under a relatively higher potential pressure than can be obtained by the use of the ordinary lubricant-expelling device having a plunger in a barrel for forcing lubricant to the nipple.

While I have illustrated the device as a booster connected with a low pressure supply by a flexible hose, it will be understood that the same type of booster may be directly and rigidly secured to the lubricant supply barrel of a lubricant-expelling device.

The device illustrated includes a body part 1 having a front head 2, presenting a reduced portion 3 externally threaded to receive a nozzle sleeve 4. The nozzle sleeve 4 presents at its outer end a plurality of relatively steel pitched female threads 5 for engagement with corresponding male threads 6 on a lubricant-receiving nipple 7. Immediately back of the female threads 5, I have provided a shoulder 8 which engages and holds in position a nozzle centering part 9 and a hat-shaped sealing washer 10. The reduced portion of the front head 2 is cored and threaded internally to receive a valve seat part 11 which holds a valve 12 and valve spring 13 in assembled relation with the front head 2, as illustrated in Figs. 1 and 2.

The valve 12 is urged toward its seat by the spring 13 bearing at one end against the front head 2 and at the other against the valve. The valve 12 presents a forwardly extending portion 14 which is slotted at 15 to permit passage of lubricant into the nipple 7 when the valve is opened thereby, as hereinafter described.

This valve 12 is guided in a valve guide chamber 16 communicating at one end with a chamber 17 into which the end of the nipple passes and at the opposite end with a passage or high pressure chamber 18 of relatively small cross-sectional area.

The body part 1 also carries a sleeve 19 which extends a substantial distance beyond the body and has a male thread 20 for engagement with the female thread 21 of a second sleeve 22 surrounding the sleeve 19. This second sleeve 22 has a cored rear head portion 23 through which passes a conduit 24 connected with a relatively low pressure source of lubricant supply in any suitable manner, but herein shown as connected by a flexible hose 25. The conduit 24 is held in engagement with the rear head portion 23 by a collar 26. The inner end of the conduit is threaded for engagement with a plunger-carrying part 27, which has a plunger 28 secured to one end thereof and extending into the chamber 18. This plunger-carrying part is cored to receive a ball check 29 seated against a seat provided in the end of the conduit 24 and held against its seat by a spring 30 seated at one end against the plunger-carrying part and the other end against the ball check 29.

The plunger 28 passes through a suitable stuffing box 31 at the inner end of the body part 1, which is packed with a hat washer 32 surrounding the plunger to prevent leakage at the rear end of the chamber 18. The plunger is also hollow to permit passage of lubricant from the conduit 24 to the chamber 18.

Between the shoulder 33 provided at the end of the body part 1 and the plunger-carrying part, I have provided a relatively heavy spring 34 which assists in returning the plunger to the rear end of the chamber when the sleeve 22 is turned in a contra-clockwise direction as hereinafter described.

The lubricant-receiving nipple 7 has a smooth end portion 35 beyond the male threads 6, sufficiently long to support the booster. At the front end of the smooth portion, I have provided a lubricant-receiving opening normally closed by a ball check 36 which may be opened by the pressure of the lubricant. The ball check is normally pressed toward its seat by a nipple spring 37 (see Fig. 2).

Assuming that the core of the plunger-carrying part, the plunger 28, the chamber 18 and the valve guide chamber 16 have been filled with lubricant from the low pressure supply tank (not shown) and assuming that the nipple 7 is secured to the part to be lubricated, the booster may be grasped by the sleeve 22, and the nozzle may be introduced over the smooth end 35 of the nipple, which, contacting with the female threads 5 in the nozzle, will guide the nozzle until the end of the nipple enters the centering part 9, herein shown as a washer. This centering part precludes cross-threading of the male and female threads of the nipple and nozzle. The female threads of the nozzle engage the male threads of the nipple and the smooth end of the nipple passes through the hat washer 10. (Fig. 1). When this screwing together operation is carried to a sufficient point, the forwardly extending portion 14 of the valve 12 will abut against the end of the nipple and the valve will be opened, as illustrated in Fig. 2, until the end of the nipple abuts against the stop shoulder 38 provided by the valve seat part 11. The valve now being fully opened, further clockwise movement turns the sleeve 22 relative to the rest of the device so that the threads between the two sleeves 19 and 22 will feed the plunger 28 forward in the chamber 18, thereby forcing the lubricant to a clogged or tight bearing under a relatively high potential pressure. Lubricant cannot pass from the chamber back past the check valve 29 and therefore must be forced out through the discharge end of the gun, as illustrated in Fig. 2. By turning the sleeve 22 in a contra-clockwise direction, the plunger 28, assisted by the spring 34 and the pressure of the lubricant in the source of supply, is drawn back in the chamber 18 until the set screw 40 (Fig. 1) abuts against the male thread 20 of the sleeve 19 to preclude further movement of the sleeve 22. At the same time lubricant flows past the ball check 29 and refills the chamber 18 and the operation of expulsion of lubricant may be repeated as above described, preferably by a relatively short oscillation of the sleeve 22, operatively advancing and retracting the check valve 29 relative to the check valve 36 in the nipple, these balls alternately opening and closing.

High pressure may also be obtained by grasping the periphery of the front head 2 or the body part 1, and turning the whole booster device in an oscillatory manner relative to the nipple 7. As the nozzle is backed off the nipple to permit closing of the valve 12, the lubricant flows past the ball check 29 to fill any space between it and the valve 12. Thus, as the device is turned in a clockwise direction again, the valve 12 begins to open and from the moment the valve opens the head of the nipple acts as a displacing plunger and compresses and forces the lubricant into the nipple under a relatively high potential pressure, the alternate operation of the check valves 29 and 36 being as described in connection with oscillation of the sleeve 22.

While I have shown and described a preferred embodiment of my invention, it will be understood that changes involving omission, substitution, alteration and reversal of parts, and even changes in the mode of operation, may be made without departing from the scope of my invention, which is best defined in the appended claims.

I claim:

1. Lubricating apparatus comprising, in combination, a booster device for use with devices expelling lubricant under relatively low pressure, said booster device comprising, in combination, a body part having a cylinder-bore and presenting at one end thereof a nozzle for engagement with a lubricant-receiving nipple, a closure valve in said nozzle openable by engagement with the nipple, a sleeve secured to the other end of said body part, a second sleeve surrounding said first sleeve, a displacing plunger of relatively small cross-sectional area operable in said cylinder-bore, and secured to said second sleeve, a check valve carried by said second sleeve for preventing return of lubricant to the source of supply, and means operable by turning said second sleeve relative to said first sleeve to move said plunger toward said closure valve thereby to force lubricant from said passage to the lubricant receiving nipple under a relatively high potential pressure.

2. Lubricating apparatus comprising, in combination, a booster device for use with devices expelling lubricant under relatively low pressure, said booster device comprising, in combination, a body part having a cylinder-bore and presenting at one end thereof a nozzle for engagement with a lubricant-receiving nipple, a closure valve in said nozzle openable by engagement with the nipple, a sleeve secured to the other end of said body part, a second sleeve surrounding said first sleeve, a displacing plunger of relatively small cross-sectional area operable in said cylinder-bore, and secured to said second sleeve, a check valve carried by said second sleeve for preventing return of lubricant to the source of supply and male threads presented by said first sleeve cooperating with female threads presented by said second sleeve to move said plunger toward said closure valve when said second sleeve is turned relative to said first sleeve, thereby to force lubricant to the nipple under relatively high potential pressure.

3. Lubricating apparatus comprising, in combination, a booster device for use with devices expelling lubricant under relatively low pressure, said booster device comprising, in combination, a body part having a cylinder-bore and presenting at one end thereof a nozzle for engagement with a lubricant-receiving nipple, a sleeve part at the opposite end of the body part presenting male threads, a second sleeve carrying a plunger operable in said cylinder-bore, a check valve carried by said second sleeve permitting flow of lubricant to said cylinder-bore while opposing flow of lubricant in the reverse direction and female threads presented by said second sleeve for cooperative engagement with the male threads of said first sleeve to move said plunger forward in said chamber to expel lubricant therefrom.

4. A booster for a lubricant compressor comprising a body part having a cylinder-bore formed therein, means secured to one end of said body part for making a sealed connection with a lubricant receiving nipple and for establishing communication between said cylinder-bore and said lubricant receiving nipple, a sleeve secured to the other end of said body part, a member slidable within said sleeve and carrying a hollow plunger of relatively small cross-section, said hollow plunger being reciprocable within said cylinder-bore, a conduit connected with said member, a non-return valve positioned between said conduit and said hollow plunger, and a second sleeve swiveled upon said conduit, said first named and second sleeves having a threaded connection for advancing and retracting said hollow plunger in said cylinder-bore by rotation of said second sleeve relatively to said first sleeve.

5. A booster for a lubricant compressor comprising a body part having a cylinder-bore therein, means connected with one end of said body part and communicating with said cylinder-bore for establishing sealed connection with a lubricant receiving nipple, said means including a valve that is moved to its open position by contact with said lubricant receiving nipple, a plunger reciprocable in said cylinder-bore, a conduit for supplying lubricant thereto, means for preventing return flow of lubricant through said conduit, rotatable means movable with respect to said conduit and said body part, and means between said rotatable means and said body part for effecting reciprocating movement of said plunger upon rotation of said rotatable means.

6. A booster for a lubricant compressor comprising a body part having a cylinder-bore therein, means connected with one end of said body part and communicating with said cylinder-bore for establishing sealed connection with a lubricant receiving nipple, a plunger reciprocable in said cylinder-bore, a conduit for supplying lubricant to said cylinder-bore, means for preventing return flow of lubricant through said conduit, rotatable means movable with respect to said conduit and said body part, and means between said rotatable means and said body part for effecting reciprocating movement of said plunger upon rotation of said rotatable means.

7. In a booster for a lubricant compressor, a body part having a high pressure cylinder therein, means connected with one end of said body part and communicating with said cylinder for establishing sealed connection with the lubricant receiving nipple, a plunger movable axially of said cylinder, said plunger having a passageway therethrough, a check valve in said passageway, a flexible conduit for supplying lubricant to said passageway and cylinder, a handle part rotatable relatively both to said cylinder and said flexible conduit and cooperating screw threads for advancing said plunger upon rotation of said handle part.

In testimony whereof, I have signed my name to this specification.

HOWARD J. MURPHY.